Feb. 6, 1951 M. CAMRAS 2,540,711

ELECTROMAGNETIC TRANSDUCER HEAD

Filed June 1, 1946

Inventor
MARVIN CAMRAS by The Firm of Charles W. Hills Attys.

Patented Feb. 6, 1951

2,540,711

UNITED STATES PATENT OFFICE 2,540,711

ELECTROMAGNETIC TRANSDUCER HEAD

Marvin Camras, Chicago, Ill., assignor to Armour Research Foundation of Illinois Institute of Technology, Chicago, Ill., a corporation of Illinois Application June 1, 1946, Serial No. 673,738

2 Claims. (Cl. 179—100.2)

This invention relates to a magnetic recording and reproducing device, and more particularly to such a magnetic device in which a bass boost is provided in the magnetic transducer head.

One of the principal types of magnetic recording and reproducing devices is one in which a traveling elongated record medium is longitudinally magnetized by a fluctuating magnetic field whose fluctuations vary as a function of the signal to be recorded. When the traveling elongated record medium is played, the varying magnetic fields along the length of the record medium induces a fluctuating signal in the pick-up coil of the magnetic head, and which signal corresponds to the previously recorded signals.

When a magnetic recording and reproducing device is used in connection with music, the bass response in the prior art machines has been inherently weak. This lack of bass response has been compensated to some extent in the past by the use of suitable electric filter circuits or equalizer circuits.

One of the principal features and objects of the present invention is to provide a novel method and means for providing bass boost in the transducer head itself rather than have to resort to conventional equalizer circuits.

A further object of the present invention is to provide a novel electro-magnetic transducer head in which, in addition to the usual pick-up means, additional means is provided for picking up low frequency signals a second time and feeding them into the input circuit of an amplifier.

Another and further object of the present invention is to provide a novel method and means for emphasizing the pick-up of low frequency signals in the magnetic transducer head of a magnetic recording and reproducing device.

Another and still further object of the present invention is to provide a novel magnetic transducer head including a novel core therefor.

The novel features which I believe to be characteristic of my invention are set forth with particularity in the appended claims. My invention itself, however, both as to its organization, manner of construction and method of operation together with further objects and advantages thereof, may best be understood by reference to the following description, taken in connection with the accompanying drawing, in which:

Figure 1:
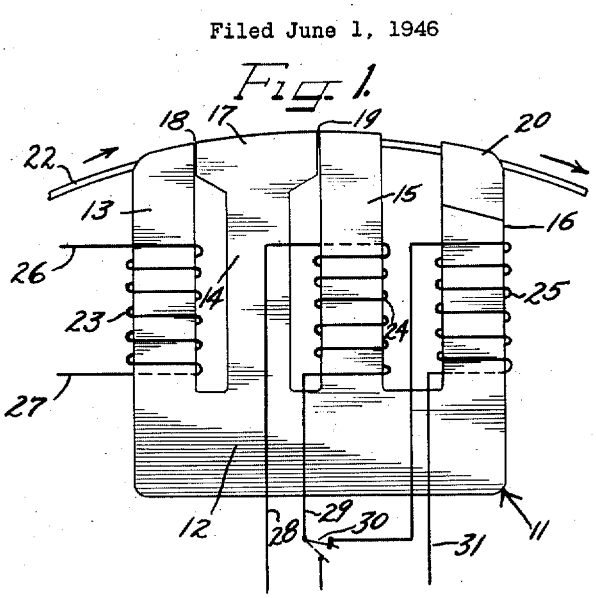
Figure 1 is a diagrammatic view of a magnetic transducer head embodying the novel teachings and principles of the present invention.
Figure 2:
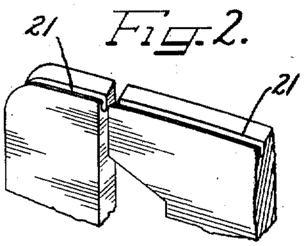
Figure 2 is an enlarged isometric view of the upper left-hand corner of the transducer head shown in Figure 1.
Figures 3, 4, 5:
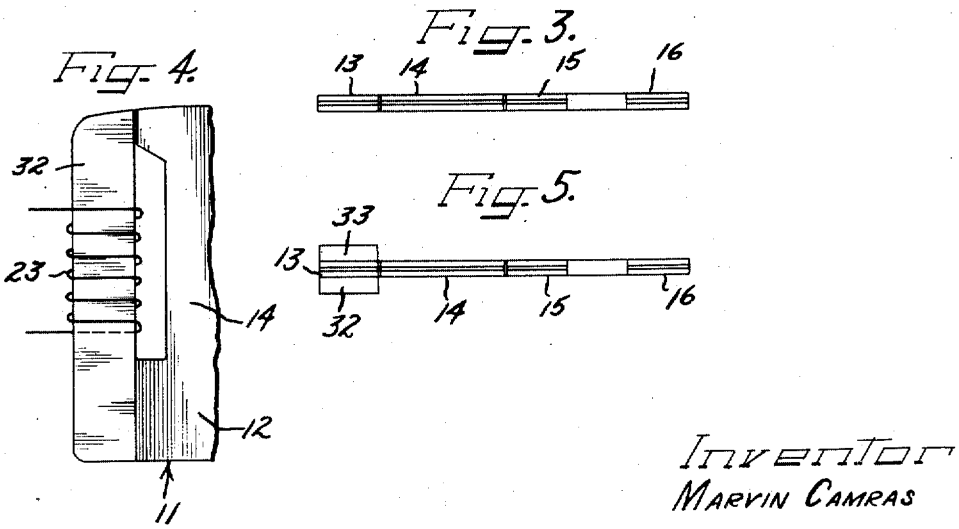
Figure 3 is a top edge view of the core of the magnetic transducer head shown in Figure 1.
Figure 4 is a fragmentary view of the left side of a magnetic transducer head similar to that shown in Figure 1, but illustrating a modified form of the present invention.
Figure 5 is a top edge view of the core structure of the modified form of the invention illustrated in Figure 4.

As shown in Figures 1 to 3 of the drawing, the magnetic transducer of the illustrated first embodiment of the present invention includes a core 11 having a base portion 12 and four upstanding legs 13, 14, 15 and 16. The core 11 may be made of any suitable material having a relatively high magnetic saturation level and low retentivity. The legs 13, 15 and 16 are substantially of uniform width throughout their length, while the leg 14 has an upper T-shaped head portion 17. The T-shaped head 17 extends into close proximity to the leg 13 to form a non-magnetic gap 18 therebetween, as well as into close proximity with the leg 15 to form a non-magnetic gap 19 therebetween.

The gap between the legs 15 and 16 is relatively wide since neither the leg 15 nor the leg 16 have a T-shaped upper end.

The leg 16 is provided with a non-magnetic tip 20 as is shown in Figure 1 of the drawing. The top edges of the legs 13, 14, 15 and 16 are grooved longitudinally of the edges as at 21 to receive an elongated traveling record medium or wire 22.

The magnetic transducer head includes three coils 23, 24 and 25. The coil 23 is the erase or demagnetizing coil of the head and is arranged to be connected through its conductors 26 and 27 to a suitable source of high frequency oscillation. This coil 23 when energized establishes a high frequency magnetic field in the non-magnetic gap 18, and this gap is of sufficient size to enable any previously recorded signal or magnetized condition of the wire 22 to be removed as it passes from left to right across the coil 11 through the groove 21. The normal signal coil of the transducer head is the coil 24. This coil is arranged to be supplied with fluctuating signal energy through the conductors 28 and 29 with the switch 30 in its dotted line position when a magnetic record is to be made on the wire 22. The non-magnetic gap 19 is relatively short as compared with the wave length of the signal to be recorded, but relatively long as compared with the high frequency energy supplied to the coil 23.

Under such a condition, the traveling wire 22 is longitudinally magnetized with the fluctuating signal following the time when it has been cleaned by passing over the non-magnetic gap 18. The coil 25 is not used during the recording process, and for that reason the leg 16 has substantially no effect on the recording process.

On reproduction, the wire 22 with its magnetic record already on is also advanced from left to right as viewed in Figure 1 of the drawing. During reproduction, however, the erase coil 23 is deenergized, and the switch 30 is turned to its full-line position as shown in Figure 1 of the drawing. This places the coils 24 and 25 in series, and by properly winding the coils 24 and 25, they will be in hum-bucking relation. The serially connected coils 24 and 25 are connected through the conductors 28 and 31 to any suitable amplifier and loud speaker device (not shown).

Due to the small size of the gap 19, all frequencies are picked up to some extent in the coil 24. In addition, however, the low frequencies are further picked up in the coil 25 due to the relatively wide spacing between the legs 15 and 16. That is to say, this large gap is sensitive only to low frequencies.

By spacing the wire 22 slightly from the end of the leg 16 (as by the non-magnetic tip 20), no pickup of highs is obtained at this point. The effect of the use of this coil 25 on a leg which defines a relatively wide non-magnetic gap with the adjacent leg is to provide bass boost. By giving bass boost magnetically, rather than electrically, in an equalizer circuit, extremely fine response is obtained, particularly in the low frequency region because less low frequency amplification is needed and less hum is picked up.

Figures 4 and 5 of the drawing illustrate a modified form of core structure for use with the magnetic transducer head illustrated in Figure 1. More particularly, the leg 13 is provided with additional laminations 32 and 33 to increase the amount of iron in the erase leg portion of the transducer head. This enables the core leg 13 to be operated at reduced flux density, thereby cutting down the iron losses. With the reenforcing pieces 32 and 33 on the leg 13 where additional iron is needed, a thinner core plate 11 may be used.

While I have shown and described a certain particular embodiment of my invention, it will, of course, be understood that I do not wish to be limited thereto, since many modifications may be made, and I, therefore, contemplate by the appended claims to cover all such modifications that fall within the true spirit and scope of my invention.

I claim as my invention:

1. A magnetic reproducing head comprising a core of relatively high magnetic permeability and low magnetic retentivity having a non-magnetic gap therein, means for guiding a magnetic record across said gap, a signal coil mounted on said core positioned to be threaded by the variable flux set up in said core by a magnetic record crossing said gap, a second gap relatively wider than the first mentioned gap and sensitive only to low frequencies and a second coil electrically connected with said first coil on said core, said second coil being positioned to be threaded only by relatively low frequency flux due to the aforesaid second gap, thereby to augment the low frequency response of said head.

2. In a device for reproducing a record from a ferromagnetic medium, a first magnetic circuit including a short gap, a second magnetic circuit including a long gap and being disposed closely adjacent said first circuit, means for guiding said ferromagnetic medium across said gaps in succession, said gaps and said guiding means being so arranged that said gaps are parallel to the line of motion of said medium, means for developing voltage responses from those portions of said medium passing through said gaps, and means for translating said responses into sound.

MARVIN CAMRAS.

REFERENCES CITED

The following references are of record in the file of this patent:

UNITED STATES PATENTS

| Number | Name | Date |
|---|---|---|
| 2,230,913 | Schuller | Feb. 4, 1941 |
| 2,265,831 | Wooldridge | Dec. 9, 1941 |
| 2,285,079 | Behre | June 2, 1942 |
| 2,411,849 | Camras | Dec. 3, 1946 |
| 2,432,162 | Jones | Dec. 9, 1947 |